3,686,166
4-DESOXY RIFAMYCIN-SV AND ITS PREPARATION

Nicola Maggi and Piero Sensi, Milan, Italy, assignors to Lepetit S.p.A.-Gruppo per la Ricerca Scientifica e la Produzione Chimica Farmaceutica, Milan, Italy
No Drawing. Filed Oct. 17, 1967, Ser. No. 675,787
Claims priority, application Great Britain Nov. 3, 1966, 44,388/66
Int. Cl. C07d 87/54
U.S. Cl. 260—239.3
3 Claims

ABSTRACT OF THE DISCLOSURE 4-desoxy-rifamycins are prepared by cooling a solution of a 4-diazo-substituted rifamycin in an organic solvent to —10° C. and then stirring in an aqueous solution of a mild reducing agent. The products have antibiotic activity.

The present invention concerns new antibiotic substances and the process for their preparation. In U.S. Pat. 3,150,046 the preparation of the antibiotic rifamycin by fermentation of a strain of Str. mediterranei ATCC 13685 is described. As stated in said patent rifamycin is a mixture of antibiotic substances. One of these substances, rifamycin B, having the crude formula $C_{39}H_{49}NO_{14}$ is a diacid and one of the acidic groups is a carboxy group. One of the particular properties of this antibiotic is an increase in activity when dissolved in water, i.e. to turn into another substance having higher antibacterial activity. The more active product, called rifamycin S, has the crude formula $C_{37}H_{45}NO_{12}$ and by mild reduction can be converted into another new antibiotic of the rifamycin class, rifamycin SV ($C_{37}H_{47}NO_{12}$). The process for preparing rifamycin SV comprises oxidation of rifamycin B to rifamycin O; hydrolysis of rifamycin O to rifamycin S with release of glycolic acid and reduction of rifamycin S to rifamycin SV. Both rifamycin S and SV lack the carboxy group which is set free in the form of glycolic acid during the activation step.

The structure of rifamycins has been elucidated by Prelog and co-workers and published in Experientia 20, 336 (1964). Rifamycin B has the following structure The above formula explains how rifamycin O, S and SV are produced from rifamycin B. The sequence of such modifications may be illustrated by considering the sole naphthalene ring present in the molecule This invention relates to a process for preparing a new class of rifamycin SV derivatives, which lack the hydroxy group in position 4. This new class of derivatives is prepared by cooling a solution of a 4-diazo-substituted rifamycin in an organic solvent at —10° C. and then cautiously adding under stirring an aqueous solution of mild reducing agents, such as alkaline bisulfites, hydrosulfites, sulfites, lithium aluminium hydride or sodium borohydride. The product is recovered by known procedures. The process reaction can be represented as follows:

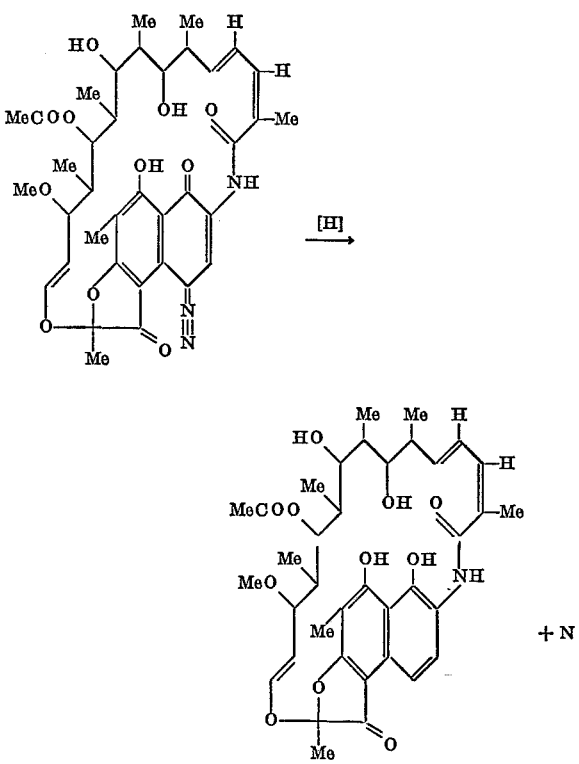

The process is of general application, in the sense that the whole class of 4-desoxy-rifamycins can be prepared according to it.

For instance good results are obtained in the case of the 3-aminomethyl-derivatives of 4-desoxy-rifamycin SV (the so-called Mannich bases), such as 3-amino-, 3-alkylamino-, 3-aralkylamino-, 3-cycloalkylaminomethyl-4-desoxy-rifamycins SV, and the analogues, having, as basic moiety of the 3-substituent, a heterocyclic radical, substituted or not, such as pyrrolidino, piperidino, morpholino and piperazino.

Another class of compounds, which can be obtained easily, comprises 4-desoxy-3-formyl-rifamycin SV and its derivatives, in which the substituent group in position 3 has the generic formula

—CH=R wherein R represents a radical such as HOH, dialkoxy, imino, substituted imino, hydrazono, substituted hydrazono.

Further the process was found to be operative when dealing with 25-desacetyl-4-desoxy-rifamycins SV and with 3-thio-4-desoxy-rifamycins SV, such as carboxyalkyl-, aminoalkyl-, dialkylaminoalkyl-, benzimidoazolyethyl-, 2 - (carboxymethylcarbamyl) - 2-($\gamma$-amino-$\gamma$-carboxypropionamido)-ethyl-, and guanidinoethyl-3-thio-4-desoxy-rifamycin SV.

The compounds of this class can be useful intermediates to obtain other compounds of the family of rifamycins, and show a remarkable degree of antibacterial activity in vitro. The data relating to 4-desoxy-rifamycin SV are summarized in the following table, in which the minimal inhibitory concentration in $\gamma$/ml. against several pathogenic organisms is given.

| | |
|---|---|
| M. aureus | 0.05 |
| S. pyog. | 0.05 |
| S. faec. | 0.2 |
| B. subt. | 1 |
| Proteus | 50 |
| E. coli | 5 |
| Kleb. pneum. | 20 |
| Pseud. aereata | 20 |
| $H_{37}R_v$ | 0.5 |

Also pharmacological tests have been carried out, concerning the toxicity and the effective dose in healing mice with experimental infection by *Staphylococcus aureus*. The following results were obtained for the 4-desoxy-rifamycin SV.

| | Mg./kg. |
|---|---|
| $LD_{50}$ sub cutan. (on mice) | 750 |
| $ED_{50}$ sub cutan. (on mice) | 11.5 |

The following nonlimitative example illustrates the invention.

EXAMPLE

Preparation of 4-desoxy-rifamycin SV

An amount of 4 g. of 4-desoxy-4-diazorifamycin S (rifamycin X, described by Sensi et al. in Il Farmaco, Sci. Ed., 16, 766, 1961) are dissolved in 300 ml. of acetone. The solution is cooled to —10° C. and then an aqueous solution of 4 g. of sodium hydrosulfite in 100 ml. of water is cautiously added under stirring. After 10 minutes the adding is ended and the mixture is poured into 2000 ml. of ice-water and an extraction is carried out with 500 ml. of ethylacetate. The organic phase is repeatedly extracted with an identical volume of phosphate solution buffered at pH 7.3 and then it is discarded. The aqueous layers are brought together, washed with ethyl acetate, and, after adjusting the pH to about 2 with aqueous 10% hydrochloric acid, are extracted with ethyl acetate. The organic layer is concentrated in vacuo and the product crystallizes out as small yellowish-green crystals. This precipitate is collected after about 15 hours (keeping the solution at 4° C.), it is washed with ethyl acetate and dried in vacuo at 45° C.

Yield 2.05 g. (54%), M.P. 160–163° C. Absorption maxima:

(1$\lambda$ max. 298 m$\mu$ ($E^{1\%}_{1cm.}$=306.3); 2) $\lambda$ max. 420 m$\mu$ ($E^{1\%}_{1cm.}$=261.4)

We claim:

1. A process for preparing 4-desoxy-rifamycin SV, which comprises treating 4-desoxy-4-diazorifamycin S, dissolved in an organic solvent, at a temperature not higher than room temperature, with a mold reducing agent of the group consisting of alkaline bisulfites, hydrosulfites and sulfites, lithium aluminum hydride, and sodium borohydride.

2. A process as in claim 1, wherein the reducing agent is an alkaline hydrosulfite.

3. 4-desoxy-rifamycin SV.

References Cited

UNITED STATES PATENTS

| 3,338,888 | 8/1967 | Bickel et al. | 260—239.3 |
| 3,342,810 | 9/1967 | Maggi et al. | 260—239.3 |
| 3,349,082 | 10/1967 | Maggi et al. | 260—239.3 |

HENRY R. JILES, Primary Examiner

R. T. BOND, Assistant Examiner

U.S. Cl. X.R.

424—244